United States Patent Office 3,299,008
Patented Jan. 17, 1967

3,299,008
PROCESS FOR PREPARING FLEXIBLE RESINIFIED PRODUCTS FROM POLYEPOXIDES AND RESULTING PRODUCTS
Albert C. Mueller, Berkeley, Calif., assignor to Shell Oil Company, a corporation of Delaware
No Drawing. Filed Dec. 23, 1958, Ser. No. 784,837
13 Claims. (Cl. 260—78.5)

This invention relates to polyepoxides, and more particularly, to a new process for preparing resinified products from polyepoxides which have improved flexibility and good strength.

Specifically, the invention provides a new and practical process for preparing insoluble infusible resinous products from polyepoxides which have excellent flexibility as well as good strength and toughness. This process comprises heating and reacting the polyepoxide, and preferably a glycidyl polyether of a polyhydric phenol, with certain proportions of an adduct of a cyclic anhydride and a long chain polyether polyhydric alcohol having a molecular weight above 400, and preferably between 600 and 10,000, and comprising the reaction product of a polyhydric alcohol and alkylene oxide or alkylene oxide derivatives, in the presence of a small amount of an alkaline catalyst. The invention further provides improved resinfied products prepared by this process.

Polyepoxides, such as, for example, those obtained by reacting epichlorohydrin with polyhydric phenols in the presence of caustic, are promising materials for use in preparing industrial products as they can be cured to form insoluble infusible products having good chemical resistance. These cured products, however, have certain undesirable characteristics which have limited their industrial application. The cured products, for example, have rather limited flexibility and this prevents their use in applications, such as coatings for cellophane, house paints, pottings and castings where some flexibility and distensibility are required.

Some efforts have been made in the past to correct this defect by adding various reactants, but the improvement obtained has not been all that has been desired. In most cases, the improvement in flexibility has been accompanied by loss of strength and toughness. In other cases, the improvement has been only temporary and after a short period of exposure the material again becomes brittle.

It is, therefore, an object of the invention to provide a new process for resinifying polyepoxides. It is a further object to provide a process for preparing insoluble infusible resinous products which have excellent flexibility and distensibility. It is a further object to provide a process for preparing resinous products from polyepoxides that have good strength and toughness in addition to flexibility. It is a further object to provide a process for preparing resinous polyepoxides that may be used as flexible coatings, and in the preparation of pottings and castings. It is a further object to provide a new process for preparing resinified polyepoxide products which are ideally suited for use as binders for solid propellants. Other objects and advantages of the invention will be apparent from the following detailed description thereof.

It has now been discoverd that these and other objects of the invention may be accomplished by the process of the invention which comprises heating and reacting the polyepoxide, and preferably a glycidyl polyether of a polyhydric phenol, with certain proportions of an adduct of a cyclic anhydride and a long chain polyether polyhydric alcohol having a molecular weight of at least 400, and preferably between 600 and 10,000, and comprising the reaction product of a polyhydric alcohol and an alkylene oxide or a substituted alkylene oxide, in the presence of a small amount of an alkaline catalyst. It has been found that the products obtained by this process have surprisingly good flexibility and distensibility and, in addition, have excellent strength and toughness. Furthermore, the resulting products have all the other properties characteristic of cured polyepoxides, such as good chemical resistance, good adhesion, and good heat stability and water resistance.

The above results are quite surprising in view of the fact that the use of the long chain polyether polyhydric alcohols alone or the use of the polyether polyhydric alcohols followed by a later addition of the cyclic anhydride fail to give the desired improvement in flexibility and tensile strength.

While the new process is of particular value in the prepparation of coatings, castings and pottings for electrical apparatus as described hereinafter, the process has been found to be particularly adapted for use in preparing solid propellants, as by acting as a binder for oxidizers as ammonium nitrate, and the like. In this application, it has been found that the materials cure in the presence of the oxidizer to form solid castings which undergo no shrinkage during cure, have excellent strength and flexibility and have good heat stability.

The polyepoxides to be used in preparing the compositions of the invention comprise those materials possessing more than one vicinal epoxy group, i.e., more than one

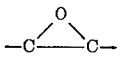

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described, in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include epoxidized esters of polyethylenically unsaturated monocarboxylic acids, such as epoxidized linseed, soybean, perilla, oiticia, tung, walnut and dehydrated castor oil, methylinoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed, and the like.

Another group of polyepoxides useful in the process of the invention include the epoxidized esters of unsaturated monohydric alcohols and polycarboxylic acids, such as, for example, di(2,3-epoxy-butyl) adipate, di(2,3-epoxybutyl) oxalate, di(2,3-epoxyheptyl) succinate, di-(2,3-epoxybutyl) maleate, di(2,3-epoxyoctyl) pimelate, di(2,3-epoxypropyl) phthalate, di(2,3-epoxycyclohexyl) adipate, di(2,3 - epoxypentyl) thiodipropionate, di(5,6-epoxytetradecyl) diphenyldicarboxylate, di(3,4-epoxheptyl) sulfonyldibutyrate, tri(2,3-epoxypropyl) 1,2,4-butanetricarboxylate, di(5,6-epoxypentadecyl) tartarate, di-(4,5-epoxytetradecyl) maleate, di(3,4-epoxybutyl) citrate, and di(4,5-epoxyoctadecyl) malonate. Preferred members of this group comprise the glycidyl esters, such as the glycidyl esters of the dicarboxylic acids, preferably containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides include the epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexymethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11-diepoxyhexadecanedioate, didecyl 9-epoxy-ethyl-10,11-epoxyoctadecenedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The material to be combined with the above-described polyepoxides comprise the adducts of cyclic anhydrides and long chain polyhydric alcohols having a molecular weight above 400 and comprising the reaction product of a polyhydric alcohol and an alkylene oxide or substituted alkylene oxide. The expression "cyclic anhydride" as used herein refers to polycarboxylic acid anhydrides having the

group in a cyclic structure, such as, for example, anhydrides of the formula

wherein R is a radical derived from the polycarboxylic acid by removing two of the carboxyl groups.

Examples of the cyclic anhydrides include, among others, succinic anhydride, maleic anhydride, octadecenyl succinic anhydride, dodecenyl succinic anhydride, chlorendic anhydride, methyl Nadic anhydride, Nadic anhydride, and anhydrides obtained by reacting maleic anhydride with unsaturated compounds, such as oils, terpinene, long chain unsaturated acids and the like, as well as anhydrides of lesser value as the aromatic anhydrides as phthalic anhydride, pyromellitic anhydride chlorophthalic anhydride and the like. Particularly preferred are the aliphatic and cycloaliphatic hydrocarbon polycarboxylic acid anhydrides, and especially the dicarboxylic acid anhydrides containing no more than 20 carbon atoms.

The long chain polyhydric alcohols used in making the adducts are obtained by reacting one mole of a polyhydric alcohol with a plurality of moles of an alkylene oxide or substituted alkylene oxide so as to yield a long chain product having a molecular weight of at least 400. The long chain alcohols derived from the dihydric alcohols may be exemplified by the following formula

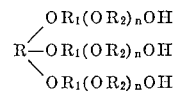

wherein R is a radical derived from the dihydric alcohol by removing the two OH groups, and $R_1$ and $R_2$ are radicals derived from the alkylene oxide by removing the epoxy groups, and $n$ is an integer greater than 1. Those derived from the trihydric alcohols may be exemplified by the following formula $$R\begin{matrix} \diagup OR_1(OR_2)_nOH \\ -OR_1(OR_2)_nOH \\ \diagdown OR_1(OR_2)_nOH \end{matrix}$$

wherein R is a radical derived from the trihydric alcohol by removing the three OH groups, and $R_1$ and $R_2$ and $n$ are as described above.

The polyhydric alcohols to be used in reacting with the alkylene oxides or substituted alkylene oxides may be exemplified by ethylene glycol, propylene glycol, butylene glycol, 1,5-pentanediol, 1,4-butanediol, 1,6-hexanediol, glycerol, trimethylolpropane, 1,2,6-hexanetriol, polyallyl alcohol, copolymers of allyl alcohol and styrene, copolymers of allyl alcohol with acrylates and the like, and polyols obtained by reacting polyallyl alcohol with dibasic acids or anhydrides. Particularly preferred polyhydric alcohols include the aliphatic polyhydric alcohols containing from 2 to 4 hydroxyl groups and from 2 to 10 carbon atoms.

Of particular value because of the tougher products obtained by the use of the resulting polyhydric alcohol half esters are aliphatic alcohols having at least 3 and preferably 3 and 4 OH groups, such as glycerol and 1,2,6-hexanetriol and from 3 to 10 carbon atoms.

The alkylene oxides and substituted alkylene oxides used in reaction with the polyhydric alcohols to form the desired long chain material include those having a terminal

group, such as, for example, ethylene oxide, propylene oxide, butylene oxide, amylene oxide, hexylene oxide, octylene oxide and decylene oxide, styrene oxide, epichlorohydrin, glycidyl ethers and glycidyl esters, such as glycidyl methacrylate, glycidyl phenyl ether, allyl glycidyl ether and the like. Especially preferred are the alkylene oxides containing from 2 to 4 carbon atoms, such as ethylene oxide, propylene oxide and butylene oxide.

In making the long chain material, a single alkylene oxide may be used or a mixture of two or more of the different alkylene oxides or substituted derivatives may be used. It is also within the scope of the invention to employ long chain polyhydric alcohols obtained by reacting the polyhydric alcohol with one or more of the alkylene oxides or derivatives and then reacting the material further with additional alkylene oxide or derivatives of a different type so as to give a "block" type structure.

If the alkylene oxide is the same as the polyhydric alcohol with the exception that it contains an epoxy group in place of the OH groups, the alcohol will have the same units and may be termed a polyoxy alkylene glycol, as polypropylene glycol.

In making the long chain material, one mole of the polyhydric alcohol is reacted with a plurality of moles of the alkylene oxide or substituted derivative depending on the number of units and molecular weight desired. In most cases, there will be at least four moles of the alkylene oxide or alkylene oxide derivative reacted per OH group on the polyhydric alcohol molecule, and preferably from 6 to 30 moles reacted per OH group. The polyhydric alcohol resulting from the reacting of alcohols with the alkylene oxides or derivatives as used in the present invention have molecular weights of at least 400, and preferably between 600 and 10,000. Still more preferably, they have molecular weights of 600 to 3,000. The molecular weights are determined ebullisocopically in ethanol.

The preparation of the long chain polyhydric alcohols from the above-described polyhydric alcohols and alkylene oxides or substituted derivatives may be accomplished by methods known to the art wherein the oxide or derivative is introduced into a reaction vessel containing the polyhydric alcohol, and preferably an alkylene catalyst, such as caustic potash, caustic soda, sodium carbonate, sodium methylate or the like, in amounts varying from about .1% to 4%. Solvents, such as benzene, xylene, cyclohexane and the like, may be used if desired. Temperatures used in the reaction generally range from about 70° C. to 200° C., and preferably between 100° C. and 150° C.

The adducts used in the process of the invention are obtained by reacting one or more of the above-described cyclic anhydrides with any of the above-described long chain polyhydric alcohols. The reactants are employed in such proportions so as to form a half ester with at least two of the OH groups present on the long chain polyhydric alcohol molecules. Thus, the adducts of the long chain polyhydric alcohols derived from the oxides and the dihydric alcohols may be exemplified by the following formula:

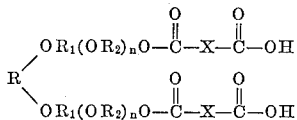

wherein R, $R_1$, $R_2$ and $n$ are as described above for the related long chain polyhydric alcohol formula and X is a radical derived from the cyclic anhydride by removing the anhydride group. The corresponding adduct derived from the cyclic anhydrides and the long chain polyhydric alcohols derived from the trihydric alcohols may be exemplified by the following formula:

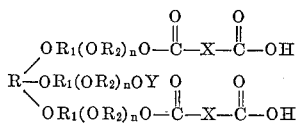

wherein R, $R_2$, $R_1$ and $n$ are as described above for the related long chain polyhydric alcohol formula, X is a radical derived from the cyclic anhydride by removing the anhydride group, and Y is hydrogen or a

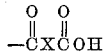

radical.

The adducts are prepared by reacting the above-described cyclic anhydrides and the long chain polyhydric alcohols together in proportions needed to effect the esterification of the terminal OH groups as noted above, preferably in the presence of an acidic catalyst. Suitable catalysts include, among others, p-toluenesulfonic acid, hydrochloric acid, acetic acid, succinic acid and the like. Such catalysts are preferably employed in amounts ranging from about .1% to 3% by weight of the reactants.

Temperatures employed in the formation of the adducts preferably range from about 50° C. to 150° C. In the presence of catalysts, temperatures much above 200° C. should not be employed as further esterification of the adducts may take place under such conditions.

The preparation of several of the adducts to be used in the working examples is illustrated below:

*Adduct of glycerol-mixed polypropylene polyethylene-glycol polyhydric alcohol and maleic anhydride*

311 grams of the glycerol-mixed polypropylene polyethylene glycol polyhydric alcohol which had a molecular weight of about 2600 was combined with 40 grams of maleic anhydride and 2 grams of p-toluene sulfonic acid. The mixture was heated for several hours at a temperature between 70–100° C. The heating was stopped when the theoretical acid number had been reached. The resulting product was a clear fluid having a visocity of about 100 poises, acidity of .121 eq./100 g. and ester value of .110 eq./100 g.

*Adduct of 1,2,6-hexanetriol-polypropylene glycol polyhydric alcohol and succinic anhydride*

401 parts of the 1,2,6-hexanetriol-polypropylene glycol alcohol which had a molecular weight of about 1500 was combined with 80 parts of succinic anhydride and 2 grams of p-toluene sulfonic acid. The mixture was heated for several hours at a temperature between 70–100° C. The heating was stopped when the theoretical acid number had been reached. The resulting product was a clear fluid having a viscosity of about 100 poises, acidity of .173 eq./100 g. and ester value of .168 eq./100 g.

*Adduct of 1,2,6-hexanetriol-polypropylene glycol polyhydric alcohol and dodecenylsuccinic anhydride*

150 parts of the 1,2,6-hexanetriol-polypropylene glycol alcohol which had a molecular weight of about 2500 was combined with 51 parts of dodecenylsuccinic anhydride and 2 grams of p-toluene sulfonic acid. The mixture was heated for 24 hours at a temperature between 70–100° C. The heating was stopped when the theoretical acid number had been reached. The resulting product was a clear fluid having a viscosity of about 70 poises, acidity of .10 eq./100 g. and ester value of .097 eq./100 g.

*Adduct of glycerol-mixed polypropylene-polyethylene glycol polyhydric alcohol and methyl Nadic anhydride*

311 parts of the glycerol mixed polypropylene glycol-polyethylene glycol polyhydric alcohol having a molecular weight of 2600 was combined with 73.5 parts of methyl Nadic anhydride and 2 grams of p-toluene sulfonic acid. The mixture was heated for several hours at a temperature between 70° C. and 100° C. The heating was stopped when the theoretical acid number had been reached. The resulting product was a clear fluid having a viscosity of about 120 poises, acidity of .105 eq./100 g. and ester value of .10 eq./100 g.

The catalysts employed in the reaction of the polyepoxides with the aforementioned adducts are preferably the tertiary amines, quaternary ammonium salts and organo-substituted phosphines. The tertiary amines may be mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanol amine, triethylamine, tributylamine, dimethylbenzylamine, triphenyl amine, tricyclohexyl amine, pyridine, quinoline, and the like. Preferred amines are the trialkyl, tricycloalkyl and triaryl amines, such as triethylamine, triphenylamine, tri(2,3-dimethylcyclohexyl) amine, and the alkyl dialkanol amines, such as methyl diethanol amine. Weak tertiary amines, e.g., amines that in aqueous solution give a pH less than 10, are particularly preferred.

The quaternary ammonium salts that may be used as catalysts for the reaction are preferably those of the formula

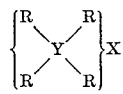

wherein Y is nitrogen, X is an ion of an inorganic acid, and R is a hydrocarbon radical, such as an alkyl, cycloalkyl, aryl, alkaryl, arylalkyl, and the like radicals. Examples of these salts include, among others, benzyltrimethylammonium chloride, benzyltrimethylammonium sulfate, benzyltrimethyl ammonium nitrate, diphenyldimethylammonium borate, diphenyldimethyl ammonium nitrate, and the like.

Particularly preferred quaternary ammonium salts are those of the above formula wherein R is an alkyl, aryl, or arylalkyl radical, preferably containing no more than 12 carbon atoms and X is a chlorine or bromine, such as benzyltrimethylammonium chloride, benzyltrimethylammonium bromide, cyclohexyltrimethylammonium bromide, phenyltrioctylammonium chloride and tetraoctylammonium chloride.

The organo-substituted phosphines that may be used as catalysts may be exemplified by the formula $P(R)_3$ wherein at least one R is an organic radical and the other R's are hydrogen or organic radicals which may be the same or different from the first R. Preferred phosphines include the trihydrocarbyl phosphines, the dihydrocarbyl phosphines and monohydrocarbyl phosphines, such as tricyclohexyl phosphine, triphenyl phosphine, trioctyl phosphine, trixylyl phosphine, diphenyl cyclohexyl phosphine, tridodecyl phosphine, cyclohexyl octyl phosphine and the like. Particularly preferred phosphines include the trialkyl, the tricycloalkyl, the tri(alkylcycloalkyl), and the triaryl and tri(alkaryl)phosphines and particularly those wherein each of the hydrocarbon radicals attached to the phosphorus atom contains no more than 12 carbon atoms, and still more preferably no more than 8 carbon atoms, with a total number of carbon atoms preferably not being more than 30. Coming under special consideration, particularly because of their high degree of activity as catalysts are the aromatic hydrocarbyl phosphines as triphenyl phosphine.

These catalysts are preferably used in amounts preferably varying from about .05% to 3% by weight and more preferably from about .1% to 2% by weight of the reactants.

In order to obtain the desired flexible product, the amount of the adduct to be combined with the polyepoxide will vary within certain limits. The adduct is preferably employed in chemical equivalent amounts, but up to 10% excess or deficient amount of the adduct can be tolerated without seriously affecting the flexibility of the product. As used herein, "chemical equivalent" amount refers to that amount needed to furnish one carboxyl group per epoxy group.

The adduct and the polyepoxide may be combined alone or in the presence of solvents or diluents. In the event one of the reactants is a solid or thick liquid, it may be desirable to employ a diluent, and preferably one that can enter the reaction, such as monoglycidyl ethers or esters, such as glycidyl butyl ether, glycidyl phenyl ether, allyl glycidyl ether, or liquid polyepoxides, such as triglycidyl ether of glycerol, diglycidyl ether of ethylene glycol and the like. The diluent or solvent is preferably employed in amounts not exceeding about 30% by weight of the mixture of reactants.

It is also possible to include other materials, such as stabilizers, plasticizers, and extenders. If employed, these added extenders should preferably be used in amounts less than about 40% by weight of the combined mixture.

After the adduct, polyepoxide and catalyst have been combined by mixing or other suitable means, the mixture is heated. Temperatures employed will preferably vary from about 50° C. to 200° C. Particularly preferred temperatures range from about 100° C. to 150° C. Heating is preferably continued until the product becomes infusible and insoluble in solvent, such as acetone and benzene.

As noted above, the process of the invention may be utilized in a variety of important applications. It may be used, for example, in coating of a variety of materials, such as wood, metal, concrete, asphalt, and the like, alone or in combination with fillers to produce coatings having excellent strength, distensitibility as well as good chemical and solvent resistance. In these applications, the adduct, polyepoxide, catalyst and solvent if desired are combined together and the mixture applied as by brushing, dipping or other suitable means to the desired surface and heat applied as by baking to insure rapid cure of the coated film.

The process may also be used in the preparation of laminated articles or resinous products reinforced with fibrous materials. Although it is preferred to use glass fiber for this purpose, other materials may be used, such as asbestos paper, mica flakes, cotton bats, duck muslin, canvas, and the like. In this application, the sheets of fibrous material are impregnated with a mixture of the adduct, polyepoxide and curing agent, and if desired, suitable solvent or diluent, and the sheets dried to remove any solvent and then cured by the application of heat alone as single sheets or in plys under pressure.

The process may also be used in preparing castings and pottings. In this case, the mixture of adduct, polyepoxide and catalyst is poured into the desired mold, which may, if desired, contain suitable electrical equipment for encapsulation, and heat applied to accelerate the cure.

As noted above, the process of the invention is particularly adapted for use in preparing solid propellants for use in rockets and the like. The process is particularly suited for such an application as the resulting propellant has excellent flexibility and distensibility as well as strength and resistance to solvents and water. In addition, the binder does not interfere with the proper functioning of the oxidizer when utilized as a fuel. In this application, the adduct, polyepoxide, catalyst and appropriate oxidizer, such as ammonium perchlorate, ammonium nitrate, potassium perchlorate, lithium nitrate and the like (in approximate amount, e.g., 50% to 85% based on weight of the combined mixture), are combined together and then heat cured as the above noted castings and pottings. The resulting product can then be used directly as a solid propellant.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

The flexibility of the castings shown in the examples was reported as percent elongation as determined by conventional procedure.

The tensile strength of the castings shown in the examples was determined in a Scott model X–5 tester and all tests were made at room temperature.

The polyepoxides reported in the examples are those shown in U.S. 2,633,458.

The catalyst DMP–30 referred to in the examples is tris(dimethylaminomethyl)phenol.

EXAMPLE I

This example illustrates the preparation of a flexible casting from Polyepoxide A and adduct of polyethylene glycol and succinic anhydride.

20.4 parts of Polyether A was combined with 79.58 parts of an adduct of polyethylene glycol and succinic anhydride having a molecular weight of 1200 and acidity of 1.90 M eq./gm., and 1% DMP–30. The mixture was blended with stirring and cured at 120° C. for several hours. The product was a hard clear homogeneous casting. The casting had tensile strength of >7255 p.s.i. and elongation of >475%.

EXAMPLE II

This example illustrates the preparation of a flexible cured product from Polyepoxide A and an adduct of a 1,2,6-hexanetriol-polypropylene glycol ether having a molecular weight of 2700 and acidity of 1.21 M eq./gm.

20.4 parts of Polyether A was combined with 78.8 parts of the 1,2,6-hexanetriol-polypropylene glycol ether succinic anhydride adduct noted above and 1% DMP-30. The mixture was blended with stirring and cured at 120° C. The product was a hard clear homogeneous casting. The casting had an elongation of 225% and a tensile strength of 208 p.s.i.

In a related experiment, the adduct was replaced by a related product of 1,2,6-hexanetriol-polypropylene glycol ether and succinic anhydride having a molecular weight of 1700 and acidity of 1.78 M eq./gm. The resulting casting was hard, tough and flexible.

EXAMPLE III

This example illustrates the preparation of a flexible product from Polyether A and an adduct of polybutylene glycol and succinic anhydride.

39.4 parts of Polyether A was combined with the 60.6 parts of an adduct of polybutylene glycol and succinic anhydride having a molecular weight of 700 and acidity of .30 eq./gm. and 1% DMP-30. The mixture was blended with stirring and cured at 100° C. The product was a hard clear homogeneous casting. The casting had an elongation of 130% and tensile strength of 704 p.s.i.

EXAMPLE IV

This example illustrates the preparation of a flexible cured product from Polyether A and an adduct of maleic anhydride and polybutylene glycol having a molecular weight of 1000.

28.6 parts of Polyether A was combined with 71.4 parts of the above-noted adduct and 2.8 parts of DMP-30. The mixture was blended and cured at 80° C. The product was a hard clear homogeneous casting. The casting had an elongation of 260 and tensile strength of 350 p.s.i.

The above was repeated using polyhydric alcohol prepared from polybutylene having a molecular weight of 500. Related product is obtained.

EXAMPLE V

This example illustrates the preparation of a flexible cured product from Polyether A and an adduct of maleic anhydride and a glycerol-polypropylene glycol alcohol having a molecular weight of 1030.

33.4 parts of Polyether A was combined with 66.6 parts of the above-noted adduct and 3.3 parts of DMP-30. The mixture was blended and cured at 80° C. The product was a hard clear homogeneous casting. The casting had an elongation of 175% and tensile strength of 608 p.s.i.

EXAMPLE VI 28.6 parts of Polyether A was combined with 71.3 parts of an adduct of maleic anhydride and a polyhydric alcohol obtained from 1,2,6-hexanetriol and propylene oxide having a molecular weight of 1500, and 1.0 parts of DMP-30. The resulting mixture is stirred and heated at 80° C. to cure. The product is a hard homogeneous casting having good flexibility and strength.

EXAMPLE VII 44.5 parts of Polyether A was combined with 55.5 parts of an adduct of maleic anhydride and a polyhydric alcohol comprising polypropylene glycol having a molecular weight of 425, and 1 part of DMP-30. The mixture was blended by stirring and cured at 80° C. The resulting product was a hard homogeneous casting. The tensile strength was 225 p.s.i. and the elongation was 227%.

EXAMPLE VIII 30.2 parts of Polyether A was combined with 69.8 parts of an adduct of dodecenyl succinic anhydride and polybutylene glycol having a molecular weight of 500, and 1 part of DMP-30. The mixture was blended by stirring and cured at 70° C. The resulting product was a hard homogeneous casting. The tensile strength was 208 and the elongation 350%.

Related results are obtained by replacing the polybutylene glycol with one having a molecular weight of 3000. The resulting product had a tensile strength of 310 and an elongation of 300%.

EXAMPLE IX 20 parts of Polyether A was combined with 80 parts of an adduct of dodecenyl succinic anhydride and a polyhydric alcohol comprising the reaction product of 1,2,6-hexanetriol and propylene oxide having a molecular weight of 2500, and 1 part of DMP-30. The mixture was stirred and cured at 70° C. The resulting product had an elongation of 250% and tensile strength of 173.

EXAMPLE X 35.2 parts of Polyether A was combined with 64.8 parts of an adduct of methyl Nadic anhydride and polybutylene glycol having a molecular weight of 500, and 1 part of DMP-30. The resulting mixture was cured at 80° C. The product was a hard homogeneous casting having tensile strength of 300 p.s.i. and elongation of 100%.

EXAMPLE XI 21.1 parts of Polyether A was combined with 78.9 parts of an adduct of maleic anhydride and a polyhydric alcohol comprising the reaction product of 1,2,6-hexanetriol and propylene oxide having a molecular weight of 2500, and 1 part of DMP-30. The mixture was stirred and cured at 100° C. The resulting product was a hard insoluble infusible casting having good flexibility and good strength.

EXAMPLE XII

This example illustrates the preparation of a flexible product from epoxidized soybean oil and an adduct of maleic anhydride and a 1,2,6-hexanetriol-polypropylene glycol polyhydric alcohol having a molecular weight of 1500.

31 parts of epoxidized soybean oil was combined with 69 parts of the adduct as noted above and 1% of DMP-30. The mixture was stirred and placed in a mold and heated at 120° C. The resulting product was a hard flexible casting.

EXAMPLE XIII

About 42 parts of a glycidyl ester of dimerized soybean oil fatty acids having an epoxy value of .38 eq./100 g., 58 parts of an adduct of maleic anhydride and a polyether of 1,2,6-hexanetriol and propylene oxide as described in Example XII and .1% of dimethylbenzylamine. The mixture was stirred and placed in an oven at 120° C. for several hours. The resulting product was a hard tough flexible casting.

EXAMPLE XIV

About 25 parts of a glycidyl ether of polyepichlorohydrin having an epoxy value of .44 eq./100 g., 75 parts of an adduct of maleic anhydride and a polyether of 1,2,6-hexanetriol and propylene oxide as described in Example XII and .1% of dimethylbenzylamine. The mixture was stirred and placed in an oven at 120° C. for several hours. The resulting product was a hard tough flexible casting.

EXAMPLE XV

About 45 parts of a copolymer of butadiene and allyl glycidyl ether having an epoxy value of .23 eq./100 g., 55 parts of an adduct of maleic anhydride and a polyether of 1,2,6-hexanetriol and propylene oxide as described in Example XII and .1% of dimethylbenzylamine. The mixture was stirred and placed in an oven at 120° C. for several hours. The resulting product was a hard tough flexible casting.

EXAMPLE XVI

About 17 parts of diglycidyl ether of resorcinol having an epoxy value of .83 eq./100 g., 83 parts of an adduct of maleic anhydride and a polyether of 1,2,6-hexanetriol and propylene oxide was described in Example XII and .1% dimethylbenzylamine were combined. The mixture was stirred and placed in an oven at 120° C. for several hours. The resulting product was a tough hard flexible casting.

EXAMPLE XVII

About 28 parts of polyglycidyl ester of mixture of sebacic and adipic acids having an epoxy value of .52 eq./100 g., 72 parts of an adduct of maleic anhydride and a polyether of 1,2,6-hexanetriol and propylene oxide as described in Example XII, and .1% of dimethylbenzylamine were combined. The mixture was stirred and placed in an oven at 120° C. for several hours. The resulting product was a tough hard flexible casting.

EXAMPLE XVIII

About 21 parts of epoxidized 2,2'-dimethyl tetrahydrobenzyl tetrahydrobenzoate having an epoxide value of .71 eq./100 g., 79 parts of an adduct of maleic anhydride and a polyether of 1,2,6-hexanetriol and propylene oxide as described in Example XII, and .1% dimethylbenzylamine were combined. The mixture was stirred and placed in an oven at 120° C. for several hours. The resulting product was a hard tough flexible casting.

Related results are obtained by replacing the above described polyepoxide with epoxidized tetrahydrobenzyl tetrahydrobenzoate.

EXAMPLE XIX

Example XVIII was repeated with the exception that the polyepoxide was vinyl cyclohexene dioxide. The resulting product was a hard tough flexible casting.

EXAMPLE XX

Example XVIII was repeated with the exception that the polyepoxide was glycidyl ether of 2,3-epoxypropylphenol. The resulting product was a hard tough flexible casting.

EXAMPLE XXI

Example XVIII was repeated with the exception that the polyepoxide was glycidyl ether of 2,6-bis(2,3-epoxypropyl)phenol. The resulting product was a hard tough flexible casting.

EXAMPLE XXII

Example XVIII was repeated with the exception that the polyepoxide was epoxidized dipentene. The resulting product was a hard flexible casting.

EXAMPLE XXIII

Examples XII to XXII are repeated with the exception that the adduct is an adduct of maleic anhydride and a polyhydric alcohol having a molecular weight of 2600 and comprising the reaction product of glycerol and a mixture of ethylene oxide and propylene oxide. Related results are obtained.

EXAMPLE XXIV

Examples I to XXIII were repeated with the exception that the catalyst was replaced by each of the following: triphenylphosphine, pyridine, dimethyl ethanolamine, tetramethylethylene diamine, cetyl trimethylammonium bromide, tetramethylammonium iodide, benzyltrimethylammonium chloride and benzyldiethylammonium bromide, and in case of the salts, the temperature employed was at about the dissociation temperature of the said salts.

I claim as my invention:

1. A process for preparing flexible insoluble infusible products from polyepoxides which consists of heating and reacting (1) a polyepoxide having more than one vic-epoxy group with (2) from .9 to 1.1 chemical equivalent amounts of a partial ester of an acid anhydride of the formula

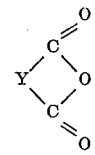

and a long chain polyhydric alcohol having a molecular weight between 600 and 10,000, said partial ester having the structural formula

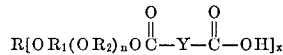

wherein R is a polyvalent saturated aliphatic hydrocarbon radical, $R_1$ and $R_2$ are radicals derived from an alkylene oxide by removing the epoxy oxygen atom, $x$ is 2 to 4, $n$ is an integer such that the molecular weight of the alcohol portion of the partial ester molecule does not exceed 10,000, and Y in the above formulae is the residue of a dicarboxylic acid hydride by removing the anhydride group, in the presence of (3) a catalyst of the group consisting of tertiary amines, quaternary ammonium salts and organo-substituted phosphines.

2. A process as in claim 1 wherein the polyepoxide is a glycidyl polyether of a polyhydric phenol having a molecular weight between 250 and 900.

3. A process as in claim 1 wherein the polyepoxide is an epoxidized polyethylenically unsaturated organic compound.

4. A process as in claim 1 wherein the polyepoxide is epoxidized tetrahydrobenzyl tetrahydrobenzoate.

5. A process as in claim 1 wherein the anhydride is maleic anhydride.

6. A process as in claim 1 wherein the anhydride is succinic anhydride.

7. A process as in claim 1 wherein the anhydride is dodecenylsuccinic anhydride.

8. A process as in claim 1 wherein the $R_1$ and $R_2$ in the structural formula are —$CH_2$—$CH_2$—$CH_2$— groups.

9. A process as in claim 1 wherein the $R_1$ and $R_2$ in the structural formula are —$CH_2$—$CH_2$— groups.

10. A process as in claim 1 wherein the $R_1$ and $R_2$ in the structural formula are —$(CH_2)_4$— groups.

11. A process as in claim 1 wherein the polyepoxide is a glycidyl polyether of a polyhydric phenol.

12. A composition that can be heated to form flexible resinified products consisting of a mixture of (1) a polyepoxide having more than one vic-epoxy group (2) from .9 to 1.1 chemical equivalent amounts of a partial ester of an acid anhydride of the formula

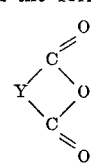

and a long chain polyhydric alcohol having a molecular weight between 600 and 10,000, said partial ester having the structural formula

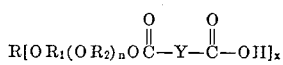

wherein R is a polyvalent saturated aliphatic hydrocarbon radical, $R_1$ and $R_2$ are radicals derived from an alkylene oxide by removing the epoxy oxygen atom, $x$ is 2 to 4, $n$ is an integer such that the molecular weight of the alcohol portion of the partial ester does not exceed 10,000, and Y in the above formulae is the residue of a dicarboxylic acid anhydride by removing the anhydride group, and (3) a catalyst of the group consisting of teritary amines, quaternary ammonium salts and organo-substituted phosphines.

13. A process as in claim 1 wherein the R is a radical derived from 1,2,6-hexanetriol by removing the OH groups.

References Cited by the Examiner
UNITED STATES PATENTS

| | | | |
|---|---|---|---|
| 2,397,602 | 4/1946 | Gresham | 260—78.4 |
| 2,640,037 | 5/1953 | Parry et al. | 260—830 |
| 2,668,805 | 2/1954 | Greenlee | 260—849 |
| 2,783,138 | 2/1957 | Parsons | 52—0.5 |
| 2,857,258 | 10/1958 | Thomas | 52—0.5 |
| 2,890,196 | 6/1959 | Phillips et al. | 260—78.4 |
| 2,908,660 | 10/1959 | Belanger | 260—831 |
| 2,947,717 | 8/1960 | Belanger et al. | 260—78.4 |
| 2,951,049 | 8/1960 | Kammerer | 260—2 |

FOREIGN PATENTS 527,051  6/1956  Canada.

JOSEPH L. SCHOFER, *Primary Examiner.*

LEON D. ROSDOL, JOSEPH R. LIBERMAN, DONALD E. CZAJA, *Examiners.*

B. R. PADGETT, W. I. ANDRESS, J. W. WHISLER, L. WOLF, *Assistant Examiners.*